May 7, 1963   R. W. FRENCH   3,089,094
REGULATED PEDESTALLED GRID BIAS SUPPLY
Filed Aug. 15, 1958   2 Sheets-Sheet 1
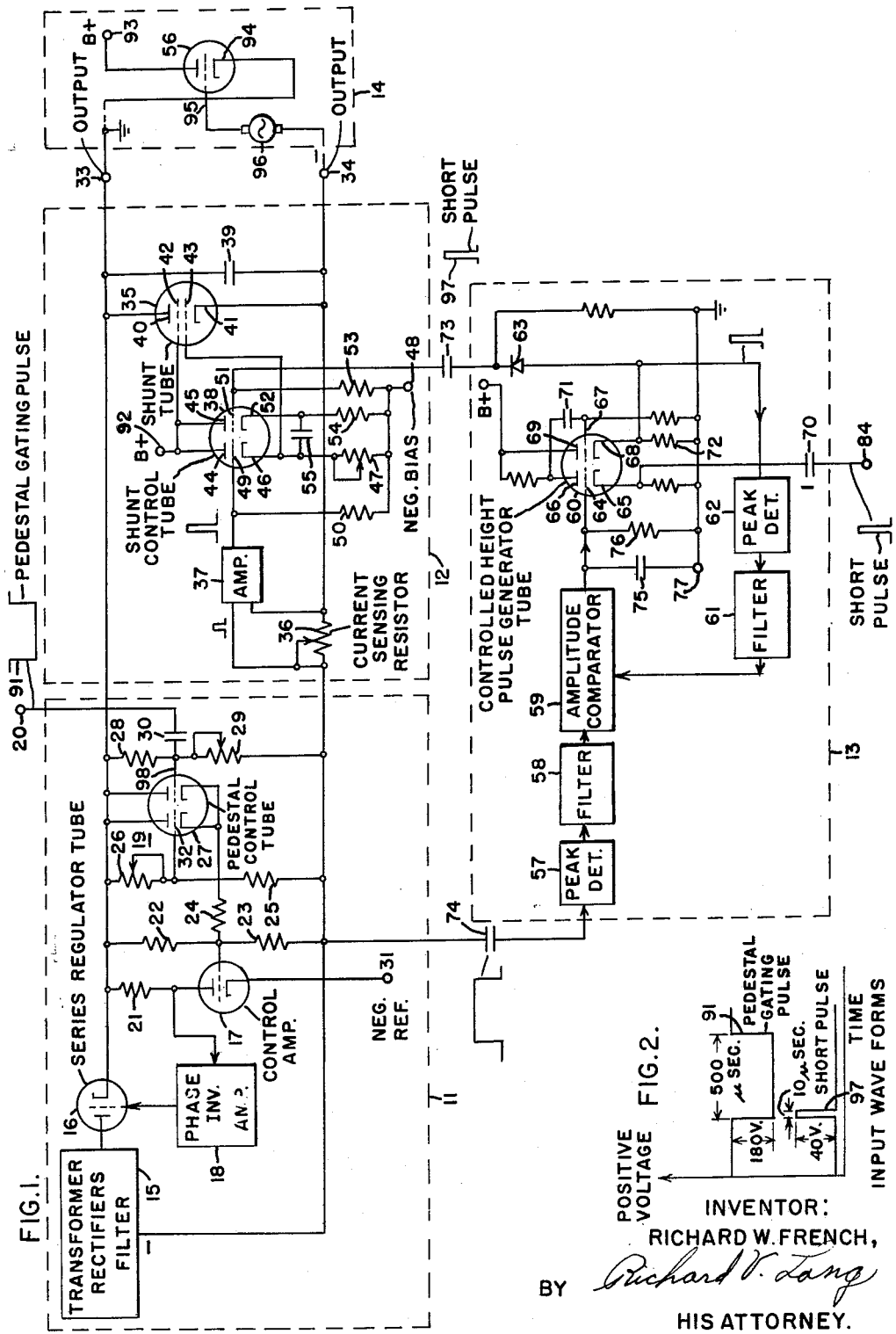
INVENTOR:
RICHARD W. FRENCH,
BY *Richard V. Lang*
HIS ATTORNEY.

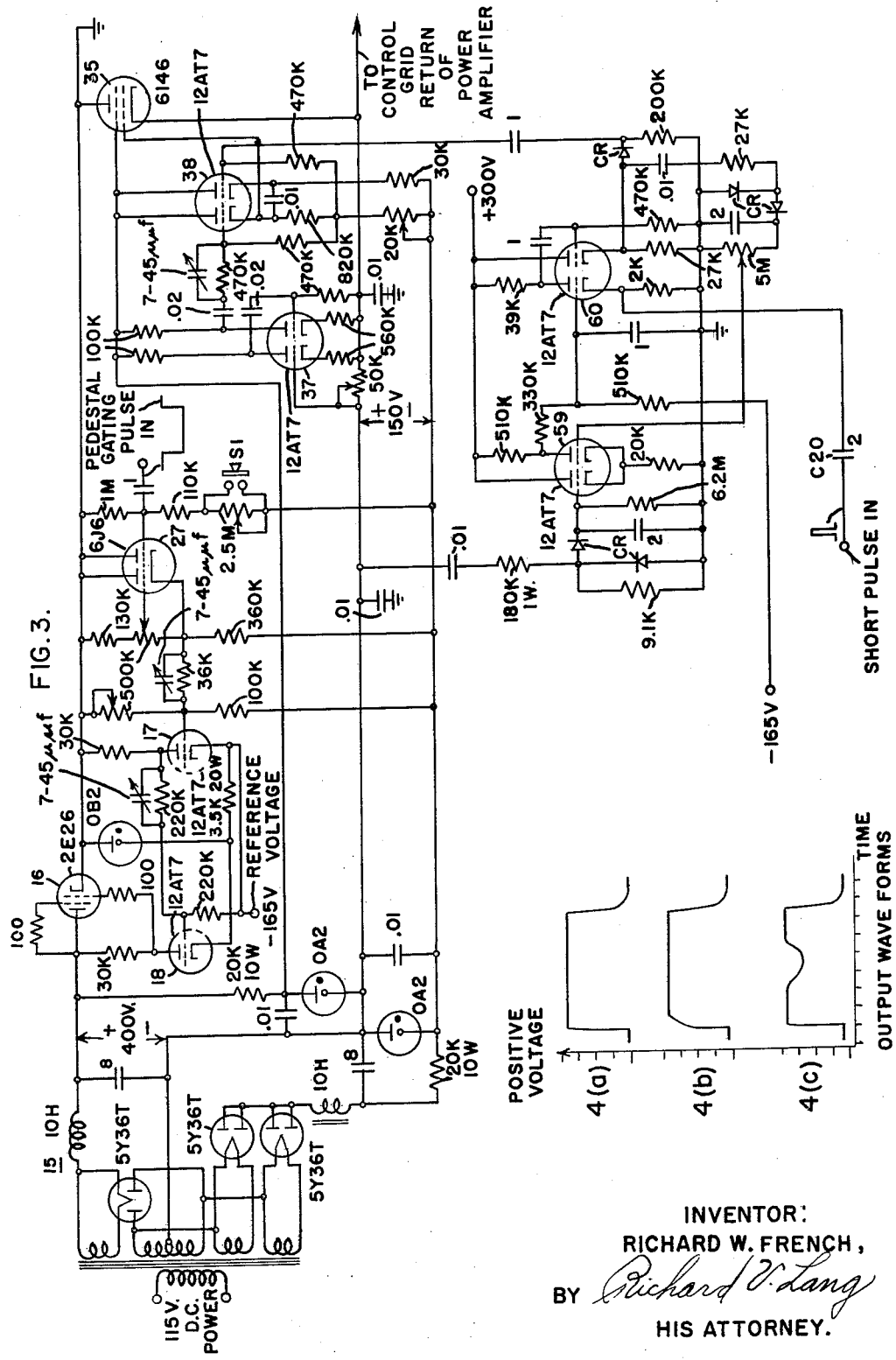

United States Patent Office 3,089,094
Patented May 7, 1963

3,089,094
REGULATED PEDESTALLED GRID BIAS SUPPLY
Richard W. French, Liverpool, N.Y., assignor to General Electric Company, a corporation of New York
Filed Aug. 15, 1958, Ser. No. 755,269
8 Claims. (Cl. 328—225)

The present invention relates to stabilized power supplies and has as a particular object thereof the provision of a novel power supply of the type providing a negative bias of a pedestalled or pulsed waveform.

The term "pedestalled" has been used because of its graphic accuracy and prevalence among engineers. As used here, it denotes a voltage waveform of generally rectangular outline, idealized as having a flat top with perpendicular sides superimposed as a "pedestal" upon an invariant base voltage.

Power supplies having these properties find application in high power radio frequency and audio frequency generators whose output is pulsed. As examples of such generators, one might list radar transmitters, pulse-modulated C.W. or M.C.W. transmitters for communications and television, as well as a number of high power generating devices primarily tools of atomic or nuclear research.

Such applications present several major demands upon the bias supply source. It is usually desirable that one or both levels of the pedestalled supply be stabilized against changes in line voltage and increases or changes in demand in the load. The demands unique to pedestalled bias supplies are that the switching between levels occur with brevity and that the output voltage not be adversely affected by a complete reversal in direction of power exchange with the load. The proper fulfillment of these prerequisites is one of the objects of the present invention.

The last two features should be considered in some detail to illustrate the precise nature of the problems inherent therein. A pedestalled bias supply has difficulty in providing a rapid rise time at the leading edge of the output voltage waveform under load conditions. In general, the waveform tends to follow an exponential path, equivalent to that of a capacitor being charged through a resistor. The capacitor involved may principally be that of the output capacitor of the filter. It is particularly desirable that a power supply be provided with a certain amount of capacity at the point of connection of the load thereto. This capacity has as one purpose the filtering out of transients such as those arising from a change in or occurrence of demand in the load. In transient periods, the capacitor (particularly if it is isolated by impedances or other means from earlier storage elements) is required to be the momentary reservoir of unchanging potential from which transient energy is supplied to the load. Since bias load demands are usually modest, a relatively small capacitor may often be used. The presence of some capacitance is usually required for circuit stability and in the usual case its presence prevents a sharp rise time in the pedestal. Applicant herein provides a solution to this problem of slow rise time.

The problem of a change in the load from one of demanding to one of supplying power is one that is common to most grid bias supplies. The problem is particularly serious when large amounts of power are involved. Let us consider the input circuit of a simple triode vacuum tube including the cathode and control grid. In ordinary connection, a uni-directional voltage source of moderate magnitude is coupled in series for direct current conduction with an alternating signal voltage of similar magnitude between grid and cathode. The bias supply is by-passed for signal frequencies. The relative polarities of these two sources are momentarily of the same sign and momentarily reversed in sign as the alternating signal changes in polarity. As long as the grid has a net negative potential with respect to the cathode, it tends to repel electrons from its surface, and the grid bias supply connected thereto is required to supply very little power. One might say also that the grid supply is isolated from the signal source under these conditions since no direct component of the signal is created. If now the uni-directional potential of the grid is adjusted to be less negative, a point occurs at which the positive peaks of signal voltage exceed the negative bias, allowing the grid to become positive with respect to the cathode, and causing electrons to land on the grid causing rectified signal current to flow in the grid circuit.

At the moment of grid current flow, a substantial power transition occurs in the grid circuit. Since the positive peaks of the signal voltage of opposite polarity to the negative bias supply have caused uni-directional current to flow in the input circuit, power is delivered from the signal supply to the grid bias supply. Thus the isolation between the signal supply and grid bias supply is momentarily interrupted. In effect, the rectifying input electrodes create a D.C. signal component of current reversed to the normal flow of current in the grid bias supply.

If the power supply is provided by unilaterally conducting elements and high impedance bleeders, the reverse current if it exceeds the steady load current of the supply finds no easy return path, and may cause a substantial change in the output voltage of the supply.

In the usual applications, the occurrence of grid current flow is of little concern. One can usually increase the forward current consumption of the supply, perhaps in bleeders coupled at the output of the bias supply to the point where the unilaterally conducting elements in the supply at all times conduct in the forward direction. In high power applications, or applications where both high power and a low duty cycle are involved, the continuous supply of adequate power to exceed and thus mask the grid current load is extremely wasteful of power and equipment. Applicant herein provides remedy to the disturbance of output voltage by this change in nature of the load.

It is another object of the present invention to provide a new and improved pedestalled power supply wherein both voltage levels are stabilized against line variations and variations in load demand.

It is a further object of the present invention to provide a new and improved power supply whose voltage is stabilized against momentary changes in load condition from one of demanding power to one of supplying power.

It is still another object of the present invention to provide a new and improved pedestalled power supply whose switching-on waveforms are abrupt.

It is a further object of the present invention to provide a new and improved stabilized pedestalled grid bias supply whose output waveform has a sharp leading edge and is unaffected by the occurrence of grid current flow.

These and other objects are achieved in accordance with a preferred embodiment of the present invention in a regulated power source of the type having a series regulator tube whose conductance is regulated by a control amplifier tube, the control amplifier tube, having one input electrode coupled to a reference source and another input electrode coupled to a voltage divider connected in shunt across the source potential. In accordance with one aspect of the invention, a pair of discharge devices is provided, coupled so that the occurrence of non-conduction of the one which is operated normally conducting causes conduction of the other which is operated normally non-conducting. These tubes are arranged to pass differing currents during their respective conductive periods, which currents are caused to pass into the voltage divider and thus influence the regulator tube control amplifier. This last influence changes the input potential of the regulator tube control amplifier by a pedestalled waveform and occasions a pedestalled waveform in the output voltage of the supply. When both discharge devices are operated as cathode followers, as is preferable, their output voltage is substantially independent of the condition of the discharge devices themselves and primarily a function of the accuracy of the resistances and source voltages establishing the grid levels. This arrangement thus introduces very little error into the reference circuit.

In accordance with a further aspect of the invention, a shunting discharge device is coupled in series with the output terminals of the composite supply, and in parallel with the output capacitor coupled thereto. By means of a resistance coupled in series in the energizing bus coupled to the negative output terminal of the supply, reductions in output current are sensed before they can cause current cut-off in the series regulator tube. These changes in current are amplified and applied to the shunt tube to cause its conductivity to increase in measure with the reversal of current in the load, and thus prevent an interruption of current in the series regulator tube.

In accordance with a further aspect of the invention, the shunt tube is arranged to become more conductive by a predetermined amount at the leading edge of each pulse, so as to discharge the output capacitor at the leading edge of each pedestal, and thus cause the output waveform to rise more abruptly. Control of the increase in conductivity is achieved by means of a novel circuit, generating a short pulse, timed to coincide with the leading edge of the usual output pulse, and whose peak, by peak to peak comparison, is approximately equal thereto. The output of this novel pulse generating circuit is connected to apply the pulse to control said shunt tube.

These aspects of the present invention cooperatively lead to an improved pedestalled grid bias supply having regulated output potentials, sharp leading edges on the output waveform, and an insensitivity to power reversal in the load. By the provisions herein outlined, considerable parts consolidation, circuit simplification and power economy have been achieved.

The features of the invention which are believed to be novel are set forth with particularity in the appended claims. The invention itself, however, both as to its organization and method of operation together with further objects and advantages thereof, may best be understood by reference to the following description when taken in connection with the drawings, wherein:

FIGURE 1 is a simplified schematic drawing illustrating a first embodiment of a pedestalled negative bias supply built in accordance with the present invention;

FIGURE 2 is an illustration of the input waveforms employed in operation of applicant's novel bias supply;

FIGURE 3 is an illustration of the same embodiment shown in FIGURE 1 but contains a more completely detailed schematic drawing; and FIGURES 4a, 4b and 4c are graphs illustrating output waveforms, and in particular the improvement in the output waveforms of applicant's novel pedestalled negative grid bias supply resulting from the inclusion of the foregoing inventive measures.

A novel pedestalled grid bias supply embodying the invention is schematically illustrated in FIGURES 1 and 3. FIGURE 1, which will be considered initially, is a somewhat simplified drawing omitting certain details contained in FIGURE 3. The bias supply, for simplification in explanation, may be treated as composed of three major functional blocks; a regulated source of pedestalled bias 11, a reverse current swamping circuit 12 and a rise time enhancing circuit 13. A typical load for which the bias supply is suited is illustrated at 14. It is formed of a vacuum tube arrayed for operation in a region at which grid current flows during signal peaks and thus supplies rectified reverse current to the bias supply.

The foregoing functional blocks cooperate to provide a regulated pedestalled grid bias supply whose output voltage is unaffected by large amounts of reverse current supplied by the load, and whose wave shape has a relatively rapid rise time. The function of the pedestalled bias block 11 is to provide the initial pedestalled bias voltage of predetermined magnitude and duration. The function of the reverse current swamping circuit is to prevent the grid current supplied from the load from disturbing the ultimate ouput voltage of the bias supply. The function of the rise time enhancing circuit 13 is to achieve a more rapid initial rise in the pedestal of the supply output waveform than would normally occur with a given capacitance spanning the output terminals of the power supply.

The pedestalled bias source 11 has as its major functional components a transformer-rectifier-filter unit shown at 15, a series regulator tube 16, a control amplifier 17 for control of the series regulator tube, an intermediate phase inverting amplifier 18, a control circuit 19 associated with the control amplifier 17, and an input terminal 20 for connection to the control circuit 19. The control circuit 19 may comprise the elements 22 through 32, and 98 omitting 31.

The elements of the pedestalled bias source 11 are connected together and function in the following manner. The transformer-rectifier in filter unit 15 provides at its output terminals a voltage of moderate magnitude (perhaps 400 volts) having a relatively low amount of alternating current ripple. As indicated earlier, the negative output terminal of the transformer rectifier filter unit 15 is arranged to be operated at a negative potential with respect to ground. The positive terminal of the unit 15 is then coupled to the anode of the series regulator tube 16. The cathode of the series regulator 16 is coupled to the ground bus which is connected to the main output terminal 33 of the composite bias supply. The control amplifier 17 is shown as a triode having its anode connected through a load resistance 21 to the ground bus and its cathode connected to a terminal 31 for connection to a source of negative reference potential not shown. The anode of the control amplifier 17 is coupled for signal transfer through the phase inverting amplifier 18 to the grid of the series regulator tube 16. The grid of the control amplifier is connected to the junction of resistances 22 and 23 connected in series in the order recited between ground and the ungrounded terminal of the transformer-rectifier-filter unit 15. The bridge formed by resistances 22 and 23 is a voltage sensing circuit by which control amplifier 17 senses a departure in the voltage being measured from that obtained from the reference source 31. The correction voltage so derived, after amplification by the control amplifier 17 and the phase inverting amplifier 18 is applied to the input electrodes of the series regulator 16. The series regulator 16 is then modified in conductivity in such a direction as to restore the voltage at the point of connection of the bridge (22—23) to the desired value.

The pedestal control circuit which is also coupled to the grid of the control amplifier 17, is used to achieve the pedestalling action in the output waveform. The pedestal control tube comprises a twin triode vacuum tube 27 having a pair of anodes, cathodes, and grids 32 and 98. Both anodes are coupled together to the ground bus. The cathodes of the pedestal control tube are also connected together and through a resistance 24 to the junction of resistances 22 and 23 and the grid of the control amplifier 17. The grid 32 of the first section of the pedestal control tube is then coupled to the junction of the adjustable resistance 26 and the fixed resistance 25, which latter resistances are connected in series in the order recited between the ground bus and the ungrounded terminal of the unit 15. The grid 98 of the second section of the twin triode 27 is coupled to the junction of a fixed resistance 28 and an adjustable resistance 29 coupled in the order recited between the ground bus and the negative terminal of the unit 15. The input terminal 20 to which pedestal gating pulses 91 are coupled for control of the waveform of the source 11 is coupled through the coupling capacitor 30 to the grid 98.

The pedestal control circuit 19 functions in the following manner. The resistances 25 and 26 are proportioned to maintain the first section of the twin triode 27 in a nonconducting state and the resistances 28 and 29 are proportioned to maintain the second section of the twin triode 27 in a normally conducting state. When a negative going pulse as illustrated at 91 is applied to the input terminal 20, through the coupling capacitor 30 to the control grid 98 of the second section of the twin triode, the second section of the twin triode is cut off. Cutting off the second section causes a momentary reduction in the voltage drop across the resistances 23 and 24, causing the cathode of the first section of the twin triode 27 to become less positive with respect to the grid 32 and thus causing the first section of the twin triode to become conducting. Conduction in the first section of the triode 27 causes a new current to flow through the resistors 23 and 24.

Considering the circuit state prior to the occurrence of the pedestal pulse 91, it may be noted that the second section of the triode 27 is conducting and passes a given amount of current through the resistors 23 and 24. During the occurrence of a pedestal gating pulse 91 the first section of the triode 27 is conducting and it passes another amount of current through the resistors 23 and 24. If now the resistors of the pairs 25, 26, 28 and 29 are differently proportioned one to the other, it will be seen that the amount of current flowing through the resistors 23 and 24 prior to the occurrence of the pedestal gating pulse will differ from that during the occurrence of a pulse. Since the control amplifier 17 is referred to a bridge containing the resistance 23 it will be seen that the voltage sensed by the control amplifier 17 is no longer purely a function of the voltage division ratio of the resistances 22 and 23 and the magnitude of the voltage across them, but it is also affected by the amount of current passing through the resistance 23 resulting from the current flowing from the pedestal control circuit 19. By adjustment of the conductive operating points of the two sections of the twin triode 27 to different levels of conduction one may achieve a substantial change in output voltage between the two output states of the bias supply. The change in output voltage may approach the full output voltage of the unit 15 less the magnitude of the negative reference voltage at 31.

It may be observed that the above outlined circuit connection of the pedestal control tube is particularly advantageous. The connection makes both sections of the control tube cathode followers. The grid voltage is determined by the resistances of the voltage divider pairs 25, 26, 28, 29 and the cathode, by the well known cathode following action tends merely to assume a potential close to that of the associated grid, and slightly positive with respect thereto. Any moderate changes in conductance in the sections of the tube 27 have little or no effect upon the cathode voltage, or the current flowing in the load circuit of the cathode, in consequence of the high accuracy of cathode "following." The error introduced is at best a second order effect arising primarily as a small change in the slightly positive voltage differential between the electrodes.

The second major functional block of applicant's novel supply is the reverse current swamping circuit 12. Its input connections are made directly to the grounded bus and to the negative output terminal of the unit 15 and its output terminals 33 and 34 respectively form the output terminals for the composite grid bias supply. The principal functional units of the swamping circuit 12 are the shunt tube 35, the current sensing resistor 36, the current change amplifier 37, the shunt control tube 38, and finally the output filter capacitance 39.

These components are coupled together in the following manner. The shunt tube 35 has its anode 40 coupled to the ground bus and its cathode 41 coupled to the bus leading to the negative output terminal. The tube 35 is additionally provided with a screen grid 42 of relatively high current rating and a control grid 43 whose connections will be specified below. The current sensing resistor 36 is adjustable and has one terminal connected to the output terminal of the unit 15 and the other terminal connected to the output terminal 34 of the composite supply. This connection causes all direct current, which passes from the supply to the load or vice versa to pass through the resistor 36. The current change amplifier 37 has its two input terminals coupled across the terminals of the current sensing resistor 37. The output terminals of the amplifier 37 are coupled to the twin triode shunt control tube 38. The shunt control tube 38 has a pair of anodes 44 and 45, respectively, which are both connected to the screen grid 42 of the shunt tube 35 and to the terminal 92 for energization by a positive source of direct potential which source has its negative terminal connected to the negative terminal of the unit 15. The cathode 46 of the first section of the twin triode 38 is coupled through an adjustable resistance 47 to the terminal 48 for connection to a source of negative bias, which source has its positive terminal connected to the negative terminal of unit 15. The input grid 49 of the first section is coupled to the output terminal of the current change amplifier 37. The grid 49 is also coupled for suitable biasing through the resistance 50 to the negative bias terminal 48. The grid 51 of the second section of the twin triode 38 and the cathode 52 of the second section of the twin triode 38 are coupled respectively through the resistances 53 and 54 to the negative bias terminal 48. Additionally, the cathode 46 and cathode 52 are joined by a small coupling capacitor 55. The cathode 46 is then coupled to the signal grid 43 of the shunt tube 35. By these connections, the two sections of the twin triode 38 may be seen to be connected as a pair of cathode followers. The bypass or filter capacitor 39 is connected in shunt between the grounded output terminal 33 and the negative ungrounded output terminal 34.

In order to more thoroughly understand the functioning of the reverse current swamping circuit 12, one may now briefly reconsider the type of load which is normally connected to the output of the supply. Such a load is shown at 14. It comprises a three electrode vacuum tube 56 having its anode connected to terminal 93 for connection to a source of positive potentials, its cathode 94 coupled to the grounded terminal 33 of the composite supply and its grid 95 coupled to one terminal of the signal source 96. The signal source 96 is shown as an alternating voltage generator having its other terminal coupled to the negative terminal of the composite supply. The signal source 96 and the composite bias supply are thus connected in series between the grid 95 and cathode 94. The bias supply for the load tube 56 is adjusted so that the tube is driven into the positive current conduction state upon certain portions of the positive phases of the signal generator. This means that rectified current from the signal source 96 tends to enter the composite supply since the signal voltage exceeds the grid bias voltage. The direction of the current flow in the power supply is opposite to the usual direction of current flow in the power supply.

When grid current flows, the load acts as a generator trying to supply additional power to the power supply.

Considering now the functioning elements of the swamping circuit 12; the current sensing resistor 36 which is coupled in series with the supply bus produces a voltage drop between its output terminals which is a function of the current flowing through the load 14. At the instant that the load 14 tends to reduce its current requirement and perhaps introduce additional current of its own generation into the supply, the voltage across the current sensing resistor is reduced. This voltage change is amplified by the amplifier 37 and applied to the grid 49 of the first section of the shunt control tube 38. It will be noted that the first section of the control tube 38 is a cathode follower having its output cathode coupled to the control grid of the shunt tube 35. Accordingly, when a reduction in current occurs, as sensed by the current sensing resistor 36, an amplified version of this reduction in current is developed in the amplifier 37 and applied to the control grid 43 of the shunt tube. The polarity of the amplified voltage is such as to cause additional current to flow through the shunt tube 35 and it is carefully proportioned in a measure to offset the error introduced by grid current in the bias load 14. The adjustable resistance 47 connected in series between the cathode 46 and the negative bias source 48 controls the normal operating level of the shunt tube 35. In the normal mode of operation, the shunt tube 35 is arranged to operate essentially linearly, with a minimum amount of plate current during the quiescent steady state. The second section of the triode 38 functions primarily in concert with the rise time enhancing circuit 13 which will now be described.

The rise time enhancing circuit 13 has as its principal components the elements 57 through 63. The function of the rise time enhancing circuit 13 is to sharpen the leading edge of the output waveform. It accomplishes this function by first amplifying a short pulse applied at the input terminal 84, timed to coincide with the leading edge of the pedestal gating pulse 91. Secondly, it applies the amplified short pulse to the second section of the shunt control tube 38 in such polarity as to reduce the rise time of the pulse at the output of the composite power supply. The pulse amplifier tube 60 is a twin triode having a control grid 64, a cathode 65 and an anode 66 in the first section and in the second section a control grid 67, cathode 68 and an anode 69. The first section of the twin triode 60 is biased to be normally conductive. However, upon the application of a positive pulse to the pulse input terminal 84, coupled by the capacitor 70 to the cathode, the cathode voltage is increased to the point where the first tube section is cut off. This causes a sharp pulse of essentially the same duration as the input pulse to appear at the anode 66. This pulse is applied to the grid 67 by means of a coupling capacitor 71, connected between the anode 66 and the grid 67. The second section of the twin triode 60 forms a cathode follower, and the sharp pulse derived from the first section appears after power amplification at the cathode 68, across the cathode load resistance 72. The output of the variable pulse generator tube 60 thus appears across the load resistance 72 and it is applied through the blocking diode 63 and coupling capacitor 73 to the control grid 51 of the shunt control tube 38.

As indicated earlier, the fast rise time circuit is used to increase the rate at which the output pulse waveform of the composite supply rises. It may be observed that the trailing edge of the output waveform tends to fall rather steeply due to conduction of the series regulator tube 16 charging capacitor 39.

The elements 57, 58, 59, 61, 62 provide a comparison circuit whereby the height of the pulse supplied by the generator tube 60 is arranged to approximate that of the output pulse so as to avoid over-stepping. The output of the pulse generator tube 60 after rectification in the peak detector 62, and filtering in the filter 61 is applied as a direct voltage input of an amplitude comparator 59.

The output of the power supply is coupled through a coupling capacitor 74 to a second peak detector 57. The pulse after peak detection is then filtered by the filter 58 and applied to the other input terminal of the amplitude comparator 59. The amplitude comparator 59 is a device which derives a D.C. output whose magnitude is a function of the difference in potential between the voltages applied at its two inputs. The output voltage of the amplitude comparator 59 is coupled through the filter circuit comprising the capacitor 75 and resistance 76 to the control grid 64 of the first section of the variable height pulse generator and thus controls the operating point thereof. In this way, the output pulse magnitude is arranged to approximate that of the waveform which is generated by the composite power supply.

The output of the fast rise time enhancing circuit, as indicated before, is applied to the second section of the shunt control tube 38. The second section of the shunt control tube 38 is also connected as a cathode follower so that voltages applied from the fast rise time circuit 13 to the grid 51 appear at the cathode 52. The coupling capacitor 55 is selected to have sufficient capacity to couple the pulses to the first section of the shunt control tube 38 and thus to control grid 43 of the shunt tube 35. In this way a change in conductance in the shunt tube 35 is caused, greatly accelerating the discharge rate of the capacitor 39. This causes a much faster rise in the leading edge of the pedestal. The shunt tube 35 should thus be selected for high conductivity, and is often of the same type as that used for series regulation. It may include a plurality of similar tubes connected in parallel.

The pedestal gating waveform 91 is shown in FIGURE 2 in proper timed relationship to the short pulse 97 developed in the rise time enhancing circuit 13. It may be observed that the pulse 91 is negative going, having a magnitude of 180 volts and a duration of 500 microseconds in the example under consideration. The short pulse 97 need only be of 10 microseconds' duration and is of 40 volts positive polarity.

A complete schematic diagram of the invention is shown in FIGURE 3. This circuit diagram bears the conventional parts designations and parameters to aid those who wish to practice the invention. It should of course be recognized that the values of these parameters and the parts selected are merely representative selections, and that the invention should in no way be limited thereto.

FIGURES 4a, 4b and 4c represent the actual output waveforms of applicant's novel bias supply under operating conditions. FIGURE 4a represents the output pulse when both the fast rise time circuit and the grid current swamping circuit are in operation.

The vertical scale of the graph is 50 volts per division, while each horizontal division represents 100 microseconds. It is seen that the rise time is remarkably short and that the pulse has a flat top. FIGURE 4b, represents the output waveform when the fast rise time circuit is adjusted for less than optimum beneficial effect. The long slow rise time shown in FIGURE 4b evidences the marked improvement which was achieved by applicant's rise time circuit. FIGURE 4c represents applicant's novel circuit with the reverse current compensation circuit adjusted for less than optimum beneficial effect, under the same load conditions illustrated in FIGURE 4a. The sharp dip in the curve of FIGURE 4c illustrates the deleterious effect that grid current flow would have on the output waveform, absent the provisions outlined above. It may be observed that a very satisfactory pedestalled grid bias supply has been devised.

Considering now certain salient features of the present invention, it may be noted that the pedestal control circuit 19 at all times preserves the output voltage sensing accuracy of the system. The voltage dividers 25, 26 and 28, 29 are coupled in series across the regulated output, thus sensing the output voltage as required with their taps making predetermined divisions of the output voltage. The cathode followers associated therewith are selected for much higher current capabilities than the currents normally flowing in the dividers, and thus serve effectively as on-off switches. By virtue of the common cathode impedances the tubes are retained in mutually opposite states of conduction making them effectively mutually opposite, on-off switches. The mutually opposite switches serve to connect either the tap on one divider 25, 26 or the tap on the other divider 28, 29 to the resistor 24 leading to the control electrode of the series regulator control amplifier. Cathode following action, as indicated earlier, with such adjustment is quite accurate and substantially independent of the tube condition.

The shunt tube 35 is of particular significance in the dual role it performs of serving to shunt reverse load current and to create the discharge path required to sharpen the leading edge of the output waveform.

While the invention has been shown in furnishing a negative output potential pedestalled in the positive direction, the invention may also be employed to provide a positive output potential pedestalled in the positive direction. The direction of pedestalling, it should be recognized, has reference only to the portion of the waveform of greatest time duration, so that one may readily exchange the time apportionments of the controlling waveforms to convert the supply to one in which the pedestalling is negative going.

In converting to a positive output waveform, it is necessary to exchange the polarity of the reference devices, omitting the phase inversion stage 18 at the output of the control amplifier 17, and timing the rise time circuit to produce a pulse at the trailing edge of the output waveform. The reverse current sensing resistor 36 would remain in the negative buss and the series regulator 16 would remain in positive buss.

While a specific embodiment of the invention has been shown and described, it should be recognized that the invention should not be limited thereto. It is accordingly intended in the appended claims to claim all such variations as fall within the true spirit of the invention.

What I claim as new and desire to secure by Letters Patent of the United States is:

1. In combination, a source of unidirectional potentials for supplying a pedestalled output voltage to a load coupled to the output terminals thereof, a resistance inserted in series between said source and one of said output terminals for sensing changes in current magnitude in said load, a variable conductance device, having a control electrode, coupled in shunt across the output terminals of said source, means coupling said control electrode to said resistance for controlling the conductivity of said variable conductance device in accordance with the current flowing in said series resistance to maintain said current constant, a filter capacitor connected in shunt across said output terminals, means for producing a short duration pulse timed to coincide with the edge of said voltage pedestal, and means for applying said short duration pulse to said control electrode for causing said conductance device to increase in conductivity to hasten the discharge of said capacitor at said edge.

2. The combination set forth in claim 1 wherein the magnitude of said short duration pulse approximates the magnitude of said pedestal.

3. The combination set forth in claim 1 wherein said means for producing a short duration pulse includes means for comparing the amplitudes of said short duration pulse and said pedestal, and amplitude adjusting means associated with said pulse producing means responsive to said comparison means for making the magnitude of said short pulse approximate that of said pedestal.

4. In combination, a source of unidirectional potentials for supplying a pedestalled output voltage to a load coupled to the output terminals thereof, a variable conductance device, having a control element, coupled in shunt across the output terminals of said source, a first discharge device having an anode, cathode and control electrode, a voltage comparator having a pair of input terminals adapted to provide an output voltage indicative of the difference in the voltages applied to said input terminals, means for coupling said comparator output voltage to said control electrode of said discharge device for adjusting the level of conduction of said discharge device, means for coupling an input pulse to said cathode for cutting off said discharge device, means coupling the pulse derived in said anode upon the cutting off of said discharge device to one input terminal of said comparator, means coupling one of said output terminals of said source to the other input terminal of said comparator, and means for connecting said anode to said control element of said variable conductance.

5. In combination: a source of unidirectional potentials having a first pair of output terminals, a second pair of output terminals for connection to a load, a series regulator tube coupled in series with one of said first pair of output terminals and one of said second pair of output terminals for delivering at its output terminal a stabilized output voltage, a control amplifier coupled to said regulator device to control its voltage regulation effect, a pair of active elements connected as cathode followers, each of the type having a high and a low conduction state and interconnected to assure mutually opposite states of conduction, and a first and second tapped voltage divider coupled in shunt with the other output terminal of said source and the output terminal of said regulator, said first active element coupling a tap on said first voltage divider to said control amplifier, and said second active element coupling a tap on said second voltage divider to said control amplifier.

6. In combination, a source of unidirectional potentials having a first pair of output terminals, a second pair of output terminals for connection to a load a series regulator coupled in series with one of said first pair of output terminals and one of said second pair of output terminals for delivering at its output terminal of a stabilized output voltage, a resistance coupled between the output terminal of said regulator and the other of said first pair of output terminals, a control amplifier coupled to said regulator device to control its voltage regulation effect having a first input electrode coupled to a source of reference potential and a second input electrode coupled to an intermediate point on said resistance, a first and second voltage divider coupled in shunt with said resistance, a pair of electron discharge devices each having an anode, a cathode and a control grid, having a common cathode resistance for causing said devices to assume mutually opposite conductive states, means coupling said discharge devices in cathode following connection wherein the control grids of the first and second discharge devices are coupled respectively to the taps on the first and second voltage dividers and said cathodes are connected together and to said input electrode.

7. In a combination for supplying a pedestalled output voltage to a load, a source of unidirectional potentials having a first pair of output terminals, a second pair of output terminals for connection to a load, a series regulator connected in series with one of said first pair of output terminals and one of said second pair of output terminals, a variable conductance device, having a control electrode, coupled in shunt between the output terminal of said regulator and the remaining terminal of said pair of output terminals, a discharge device having an anode, cathode and control electrode, biasing means to maintain said discharge device normally conductive, a voltage comparator having a pair of input terminals adapted to provide a voltage at the output thereof indicative of the difference in the voltages applied to said input terminals, means for coupling said output to said control electrode of said discharge devices for adjusting the level of conduction of said discharge device, means for coupling an input pulse to said cathode for cutting off said discharge device for the duration of said pulse, means connected to said anode for coupling the pulse derived therein upon the cutting off of said discharge device in degenerative relationship to one input terminal of said comparator, means supplying to the other input terminal of said comparator a voltage indicative of the regulated output for controlling the amplitude of said output pulse in accordance therewith, and means coupling an output derived from the anode of said discharge device to the control electrode of said variable conductance device.

8. In a combination for supplying a pedestalled output voltage to a load, a source of unidirectional potentials having a first pair of output terminals, a second pair of output terminals for connection to a load, a series regulator connected in series between one of said first pair of output terminals and one of said second pair of output terminals, resistance means coupled in shunt with the output of said series regulator and the other of said first pair of output terminals, a control amplifier coupled to said regulator device to control its voltage regulation effect and having a first input electrode coupled to a source of reference potentials and a second input electrode coupled to an intermediate point on said resistance means, a first and a second tapped voltage divider coupled in shunt with said resistance means, switching means for connecting exclusively one or the other of the taps on said voltage dividers to said second input electrode, a resistance inserted in series between the other of said first pair and the other of said second pair of output terminals for sensing changes in current magnitude in said load, a variable conductance device, having a control electrode, coupled in shunt across said second pair of output terminals, means coupling said control electrode to said resistance for controlling the conductivity of said variable conductance device in accordance with the current flowing in said resistance to maintain the current flow to said load constant, a filter capacitor connected in shunt across said second output terminals, means for producing a short duration pulse timed to coincide with the edge of said voltage pedestal having a falling output voltage, and means for applying said short duration pulse to the control electrode of said conductance device to increase its conductivity and thus hasten the discharge of said capacitor at said edge.

References Cited in the file of this patent
UNITED STATES PATENTS

| | | |
|---|---|---|
| 2,628,340 | Potter | Feb. 10, 1953 |
| 2,643,359 | Shenk et al. | June 23, 1953 |
| 2,710,940 | Armstrong | June 14, 1955 |
| 2,749,512 | Blair | June 5, 1956 |
| 2,752,555 | Light | June 26, 1956 |
| 2,790,133 | Day | Apr. 23, 1957 |
| 2,798,153 | Valeton | July 2, 1957 |
| 2,802,941 | McConnell | Aug. 13, 1957 |
| 2,806,198 | Fredrick | Sept. 10, 1957 |
| 2,810,105 | Henrich | Oct. 15, 1957 |
| 2,830,272 | Johnson et al. | Apr. 8, 1958 |
| 2,840,777 | De Blasio | June 24, 1958 |
| 2,854,618 | Crowther | Sept. 30, 1958 |
| 2,866,151 | Applin et al. | Dec. 23, 1958 |
| 2,885,626 | McNamee | May 5, 1959 |
| 2,942,172 | Holtje | June 21, 1960 |